(12) United States Patent
Chon et al.

(10) Patent No.: US 11,251,605 B2
(45) Date of Patent: Feb. 15, 2022

(54) SYSTEM AND METHOD FOR PROTECTING INVERTER IN VEHICLE FROM OVERVOLTAGE

(71) Applicants: HYUNDAI MOTOR COMPANY, Seoul (KR); KIA MOTORS CORPORATION, Seoul (KR)

(72) Inventors: Chae Duck Chon, Suwon-si (KR); Nam Koo Han, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/024,952

(22) Filed: Sep. 18, 2020

(65) Prior Publication Data
US 2021/0320492 A1 Oct. 14, 2021

(30) Foreign Application Priority Data
Apr. 10, 2020 (KR) .................. 10-2020-0044229

(51) Int. Cl.
| | | |
|---|---|---|
| *H02H 7/122* | (2006.01) | |
| *H02P 27/06* | (2006.01) | |
| *B60L 3/04* | (2006.01) | |

(52) U.S. Cl.
CPC ............. *H02H 7/122* (2013.01); *B60L 3/04* (2013.01); *B60L 2210/40* (2013.01); *H02P 27/06* (2013.01)

(58) Field of Classification Search
CPC ....... H02H 7/122; B60L 3/04; B60L 2210/40; H02P 27/06
See application file for complete search history.

(56) References Cited

U.S. PATENT DOCUMENTS
2017/0113680 A1* 4/2017 Shimizu ............... B60L 3/0092

FOREIGN PATENT DOCUMENTS
KR 10-2011-0105034 A 9/2011

* cited by examiner

*Primary Examiner* — Jue Zhang
(74) *Attorney, Agent, or Firm* — Morgan, Lewis & Bockius LLP (57) ABSTRACT

A system for protecting an inverter in a vehicle from an overvoltage may include an inverter including a plurality of switching elements and converting energy supplied from an energy storage into AC power, a motor driven by the AC power converted by the inverter, a capacitor connected in parallel between the inverter and the energy storage and storing regenerative energy of the motor during regenerative braking, and a controller turning off a relay that connects the energy storage and the motor, when a voltage (DC-link voltage) of the capacitor measured by a voltage sensor is equal to or greater than a preset first voltage, and operating the switching elements in the inverter in response to a pre-stored current command (Id*, Iq*) to apply a zero vector to the motor.

10 Claims, 7 Drawing Sheets

SYSTEM AND METHOD FOR PROTECTING INVERTER IN VEHICLE FROM OVERVOLTAGE

CROSS REFERENCE TO RELATED APPLICATION

The present application claims priority to Korean Patent Application No. 10-2020-0044229, filed Apr. 10, 2020, the entire contents of which are incorporated herein for all purposes by this reference.

TECHNICAL FIELD

The present disclosure relates to a system and a method for protecting an inverter in a vehicle from an overvoltage.

BACKGROUND

Recently, in response to the crisis of air pollution and oil depletion, technologies related to eco-friendly vehicles that use electric energy as the power of a vehicle are being actively developed. The eco-friendly vehicles include a hybrid electric vehicle, a fuel cell electric vehicle, and an electric vehicle.

Figure 1:
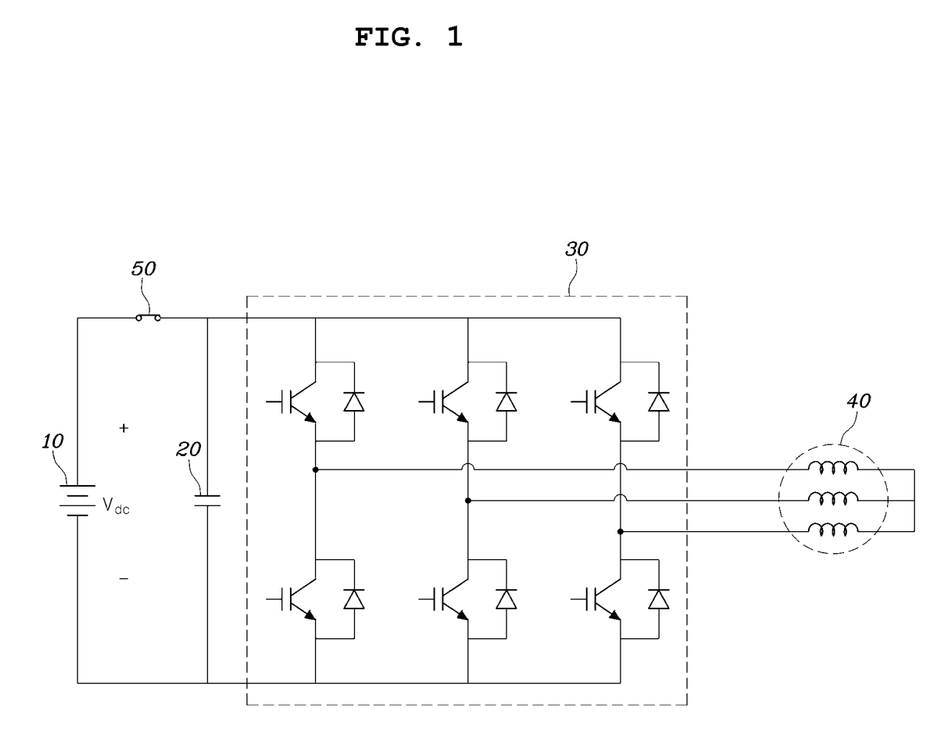
FIG. 1 is a schematic view illustrating an inverter system included in a common electric vehicle.

Meanwhile, the electric vehicle includes an inverter system so as to drive a motor as shown in FIG. 1. However, the electric vehicle including the conventional inverter system turns off a relay 50 that connects a high voltage battery 10 and a motor 40, when a DC link voltage (voltage on both ends of a capacitor 20) of the inverter 30 exceeds a predetermined voltage level. In this case, the electric energy flows excessively from the motor towards the capacitor 20, so that the DC link voltage applied to both ends of the capacitor 20 designed in the inverter system rises sharply. Consequently, the burn-out of the inverter may be caused by the overvoltage.

Accordingly, there is a need to develop a technology that can prevent the burn-out of the inverter due to an overvoltage.

The foregoing is intended merely to aid in the understanding of the background of the present disclosure, and is not intended to mean that the present disclosure falls within the purview of the related art that is already known to those skilled in the art.

SUMMARY

The present disclosure has been made in order to solve the above-mentioned problems in the related art and an objective of the present disclosure is to provide a system and a method for protecting an inverter in a vehicle from an overvoltage, which can prevent the burn-out of the inverter due to the overvoltage.

In order to achieve the objective of the present disclosure, the present disclosure provides a system for protecting an inverter in a vehicle from an overvoltage, the system including an inverter including a plurality of switching elements, and converting energy supplied from an energy storage into AC power; a motor driven by the AC power converted by the inverter; a capacitor connected in parallel between the inverter and the energy storage, and storing regenerative energy of the motor during regenerative braking; and a controller turning off a relay that connects the energy storage and the motor, when a voltage (DC-link voltage) of the capacitor measured by a voltage sensor is equal to or greater than a preset first voltage, and operating the switching elements in the inverter in response to a pre-stored current command ($Id^*$, $Iq^*$) to apply a zero vector to the motor.

The inverter may include a first leg including a first switching element and a second switching element located on a lower end of the first switching element; a second leg including a third switching element and a fourth switching element located on a lower end of the third switching element; and a third leg including a fifth switching element and a sixth switching element located on a lower end of the fifth switching element, wherein output terminals of the first leg, the second leg, and the third leg may be connected to respective phases of the motor.

When the plurality of switching elements is driven, the current command ($Id^*$, $Iq^*$) may cause the first switching element, the third switching element and the fifth switching element to be on, or cause the second switching element, the fourth switching element and the sixth switching element to be on, so as to apply the zero vector to the motor during driving of the motor and cause minus torque to be generated in the motor. If the first switching elements, the third switching element and the fifth switching element is turned on, the second switching element, the fourth switching element and the sixth switching elements is turned off.

The controller may include a memory storing a map of the current command ($Id^*$, $Iq^*$) causing the zero vector to be applied to the motor during the driving of the motor; an overvoltage detector determining whether a voltage on both ends of the capacitor measured by the voltage sensor is equal to or greater than the first voltage; a current control part generating a voltage command ($Vd^*$, $Vq^*$) to cause a d-axis current (Id) and a q-axis current (Iq) fed back from the motor to follow a d-axis current command ($Id^*$) and a q-axis current command ($Iq^*$) stored in the memory; and a switching-element control part operating the plurality of switching elements in the inverter in response to the generated voltage command ($Vd^*$, $Vq^*$).

When the measured voltage on both ends of the capacitor is equal to or greater than the first voltage, the controller may turn off the relay, and may cause current supplied from the inverter to the motor to follow the current command.

When the voltage on both ends of the capacitor is equal to or greater than the first voltage, the controller may turn off the relay, may discharge the voltage of the capacitor up to a preset second voltage, and then may cause the voltage of the capacitor to be maintained within an error range on the basis of the second voltage.

When the voltage on both ends of the capacitor is reduced below the error range on the basis of the second voltage, the controller may increase the voltage of the capacitor through the regenerative braking, and when the voltage on both ends of the capacitor exceeds the error range on the basis of the second voltage, the controller may discharge the voltage of the capacitor through the driving of the motor.

According to another aspect of the present disclosure, a method for protecting an inverter in a vehicle from an overvoltage may include determining whether a voltage on both ends of a capacitor measured by a voltage sensor is equal to or greater than a first voltage, turning off a relay that connects an energy storage and a motor, when the voltage on both ends of the capacitor is equal to or greater than the first voltage, and operating a switching element in the inverter in response to a current command ($Id^*$, $Iq^*$) to cause a zero vector to be applied to the motor.

The method may further include storing, in a memory, a map of the current command ($Id^*$, $Iq^*$) to cause the zero vector to be applied to the motor, before the determining whether the voltage on both ends of the capacitor measured by the voltage sensor is equal to or greater than the first voltage.

The operating the switching element in the inverter in response to the current command (Id*, Iq*) to cause the zero vector to be applied to the motor may include generating, by a current control part, a voltage command (Vd*, Vq*) to cause a d-axis current (Id) and a q-axis current (Iq) fed back from the motor to follow a d-axis current command (Id*) and a q-axis current command (Iq*) stored in the memory, and operating, by a switching-element control part, the switching element in the inverter in response to the generated voltage command (Vd*, Vq*).

The method may further include, when the voltage on both ends of the capacitor is equal to or greater than the first voltage, after the turning off the relay that connects the energy storage and the motor, discharging the voltage of the capacitor up to a preset second voltage, and maintaining the voltage of the capacitor within an error range on the basis of the second voltage.

The maintaining the voltage of the capacitor within the error range on the basis of the second voltage may include increasing, by a controller, the voltage of the capacitor through regenerative braking when the voltage on both ends of the capacitor is reduced below the error range on the basis of the second voltage, and discharging, by the controller, the voltage of the capacitor through driving of the motor when the voltage on both ends of the capacitor exceeds the error range on the basis of the second voltage.

According to the present disclosure, it is possible to protect an inverter in a vehicle from an overvoltage.

Furthermore, the driving time of other electronic components can be increased by maintaining a DC link voltage (voltages on both ends of a capacitor) in an inverter system at a predetermined voltage and providing the corresponding voltage to other electronic components in a vehicle.

In addition, since the pre-charge time of a capacitor can be reduced when a vehicle is restarted during driving by maintaining voltages on both ends of the capacitor in an inverter system at a predetermined voltage, the vehicle can have a quick response time when it is restarted.

BRIEF DESCRIPTION OF THE DRAWINGS

The above and other objectives, features, and other advantages of the present disclosure will be more clearly understood from the following detailed description when taken in conjoint with the accompanying drawings, in which.

DETAILED DESCRIPTION

Hereinafter, a system and a method for protecting an inverter in a vehicle from an overvoltage according to a preferred embodiment of the present disclosure will be described in detail with reference to the accompanying drawings.

Figure 2:
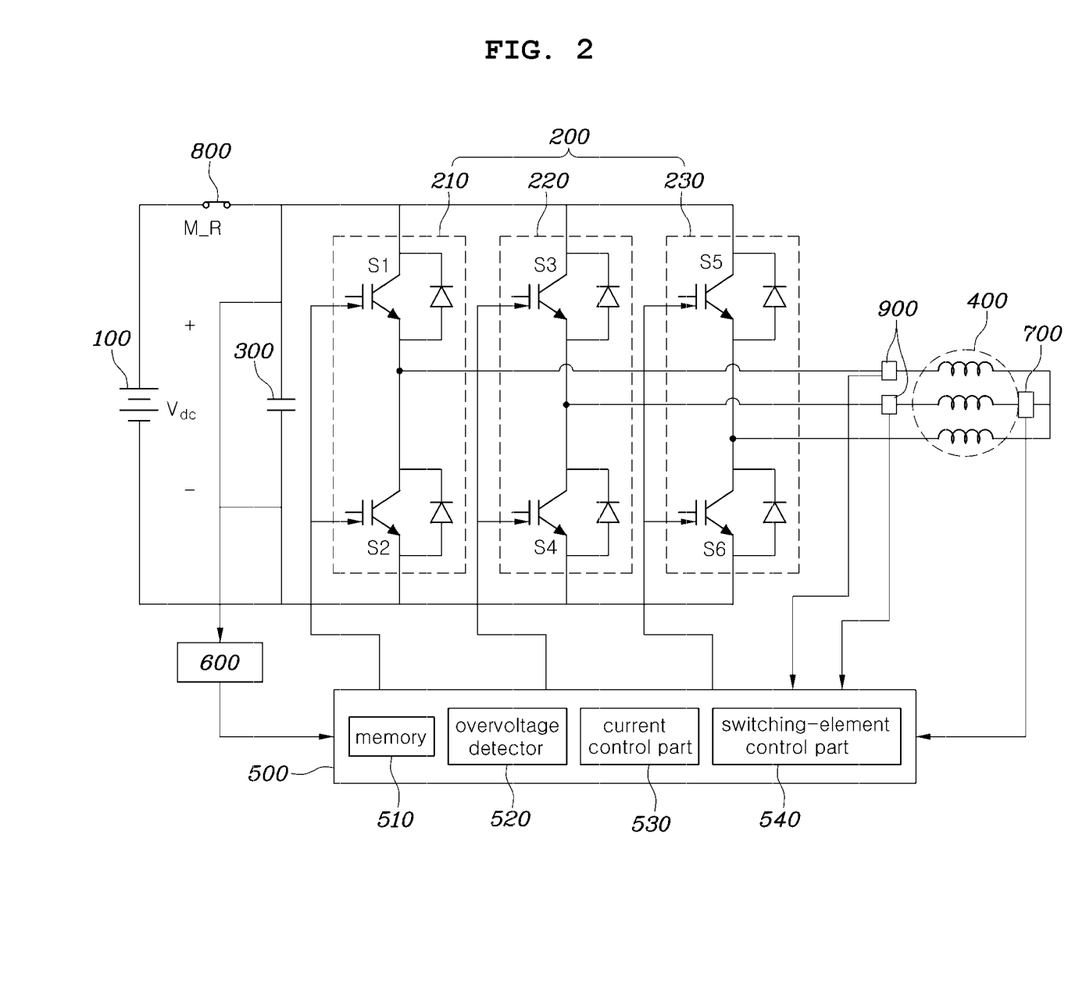
FIG. 2 is a schematic view illustrating a system for protecting an inverter in a vehicle from an overvoltage according to an embodiment of the present disclosure.
Figure 3:
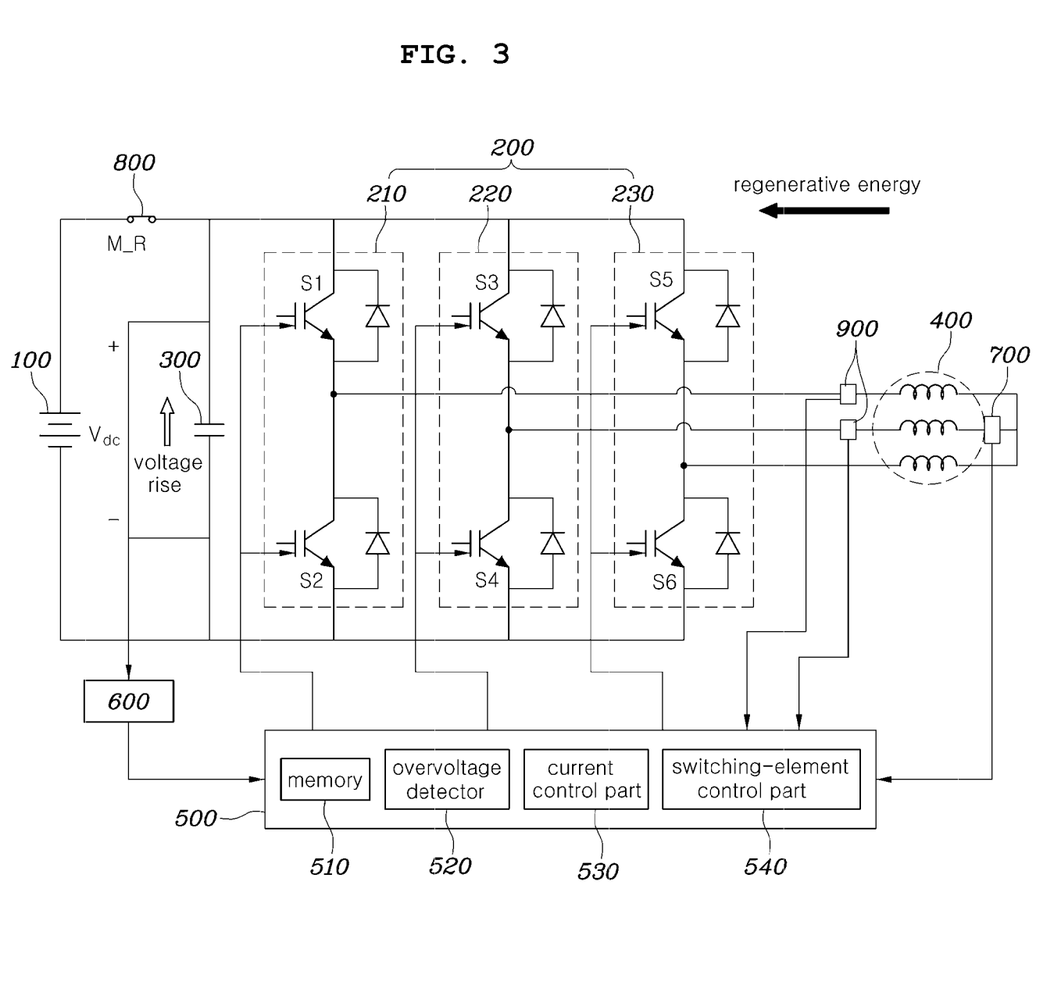
FIG. 3 is a diagram illustrating the system before a failure occurs, in the system for protecting the inverter in the vehicle from the overvoltage according to the embodiment of the present disclosure.
Figure 4:
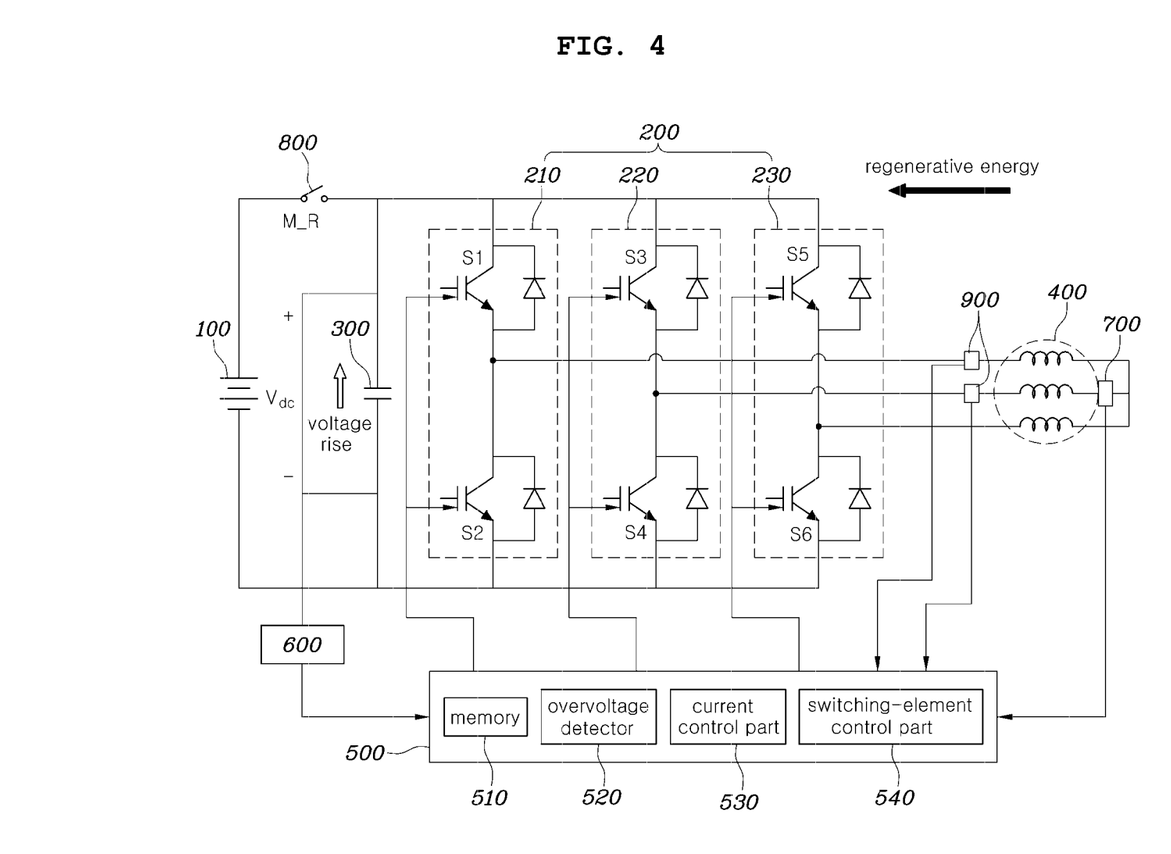
FIG. 4 is a diagram illustrating a situation in which a relay is off when the failure occurs, in the system for protecting the inverter in the vehicle from the overvoltage according to the embodiment of the present disclosure.
Figure 5:
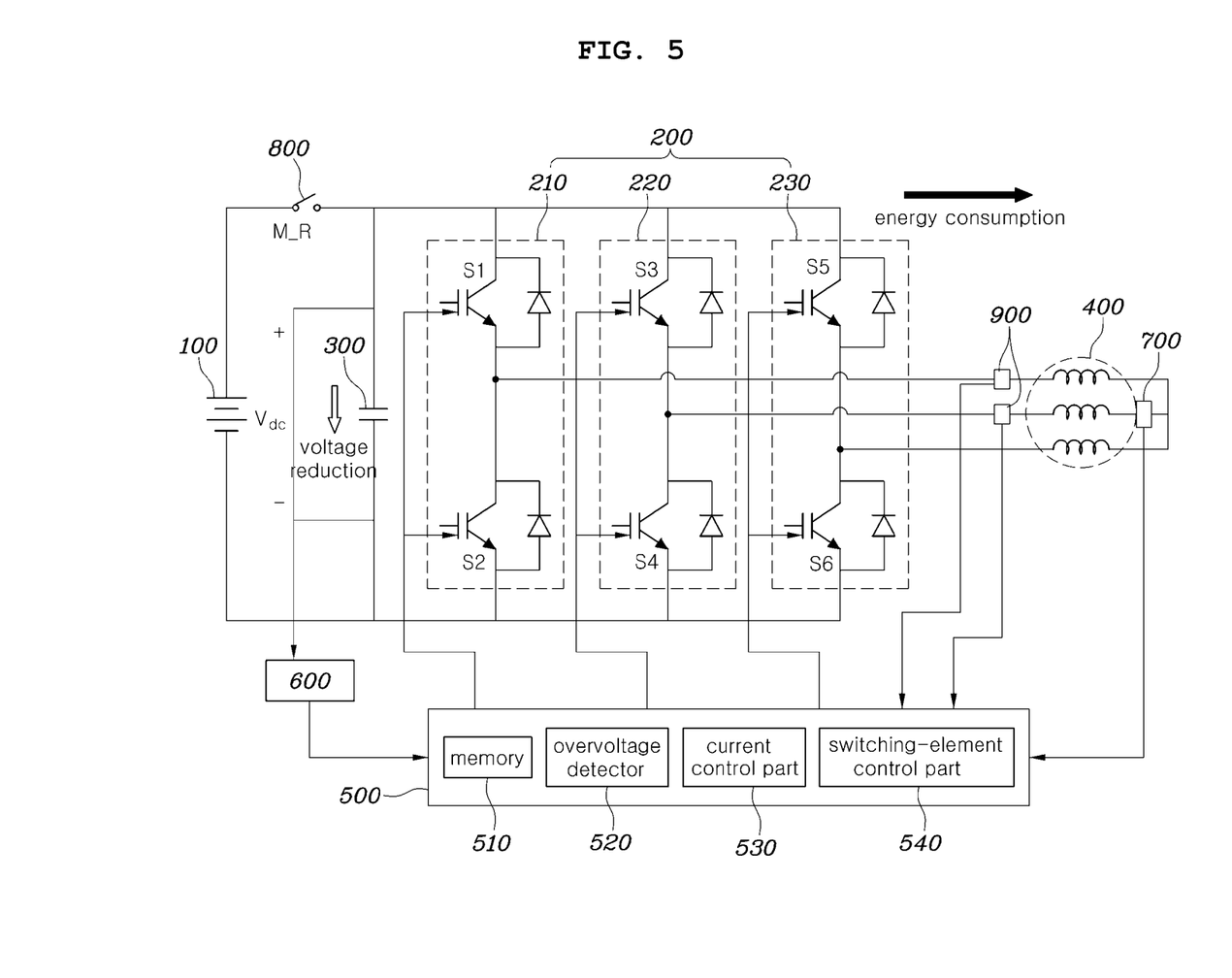
FIG. 5 is a diagram illustrating a state in which the voltage of the capacitor is discharged after the failure occurs, in the system for protecting the inverter in the vehicle from the overvoltage according to the embodiment of the present disclosure.
Figure 6:
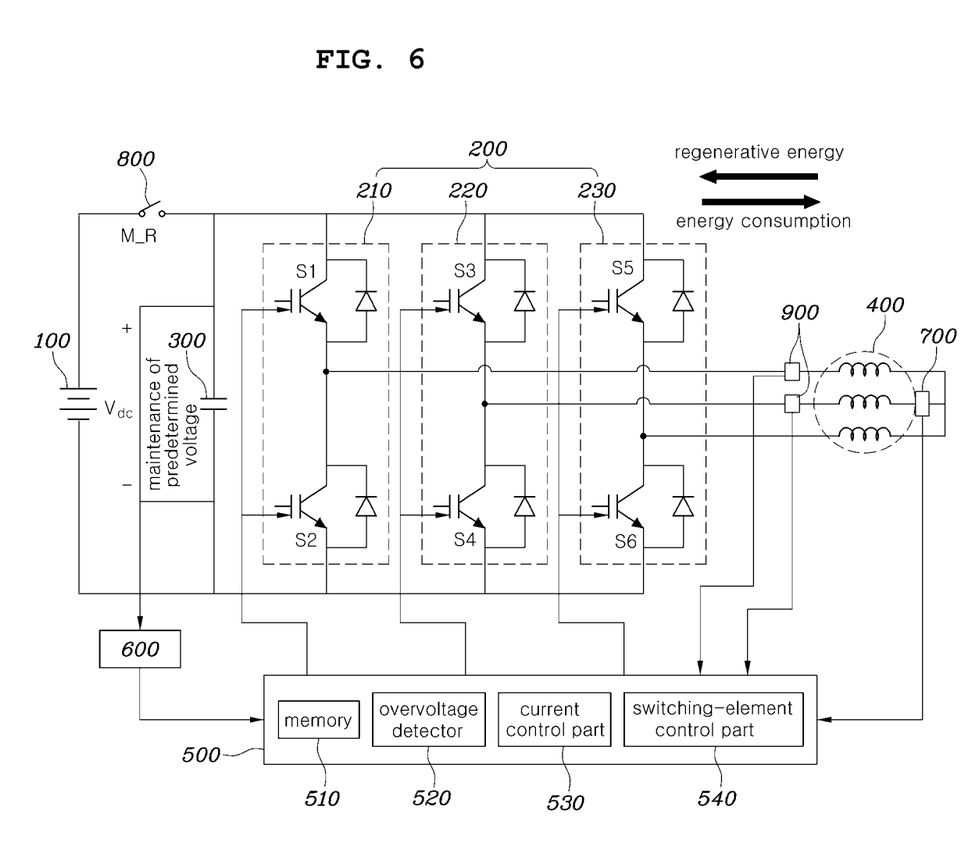
FIG. 6 is a diagram illustrating a state in which voltages on both ends of the capacitor are maintained at a predetermined voltage, in the system for protecting the inverter in the vehicle from the overvoltage according to the embodiment of the present disclosure.
Figure 7:
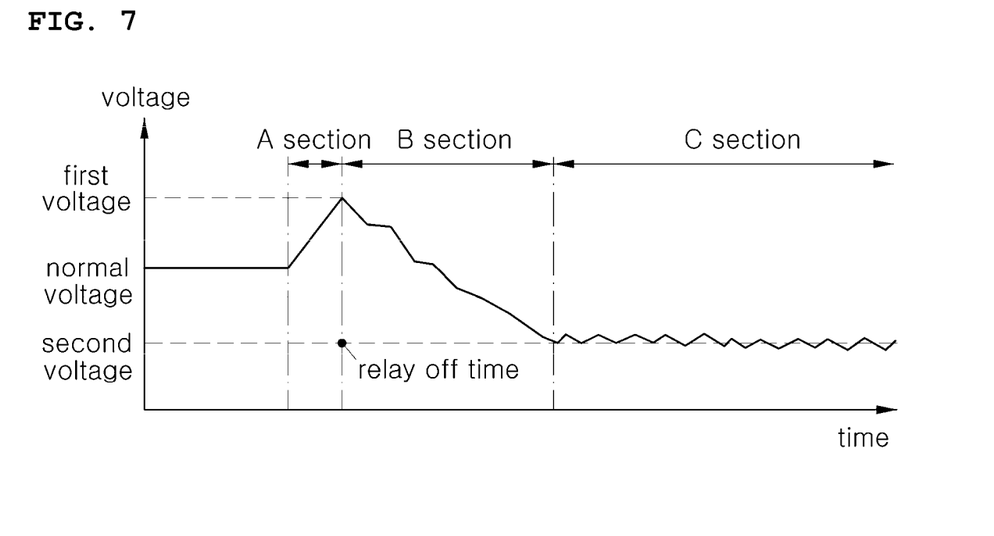
FIG. 7 is a diagram illustrating an operation of the system for protecting the inverter in the vehicle from the overvoltage according to the embodiment of the present disclosure.

FIG. 2 is a schematic view illustrating a system for protecting an inverter in a vehicle from an overvoltage according to an embodiment of the present disclosure, FIG. 3 is a diagram illustrating the system before a failure occurs, in the system for protecting the inverter in the vehicle from the overvoltage according to the embodiment of the present disclosure, FIG. 4 is a diagram illustrating a situation in which a relay is off when the failure occurs, in the system for protecting the inverter in the vehicle from the overvoltage according to the embodiment of the present disclosure, FIG. 5 is a diagram illustrating a state in which the voltage of the capacitor is discharged after the failure occurs, in the system for protecting the inverter in the vehicle from the overvoltage according to the embodiment of the present disclosure, FIG. 6 is a diagram illustrating a state in which voltages on both ends of the capacitor are maintained at a predetermined voltage, in the system for protecting the inverter in the vehicle from the overvoltage according to the embodiment of the present disclosure, and FIG. 7 is a diagram illustrating an operation of the system for protecting the inverter in the vehicle from the overvoltage according to the embodiment of the present disclosure.

As shown in FIG. 2, the system for protecting the inverter in the vehicle from the overvoltage according to the present disclosure may include an energy storage 100, an inverter 200, a capacitor 300 connected in parallel between the inverter 200 and the energy storage 100, a motor 400, and a controller 500. The system may further include a voltage sensor 600 that measures voltages on both ends of the capacitor 300, a rotation-angle sensor 700 that detects the rotation angle of a rotor of the motor 400, and a current sensor 900 that measures current input into the motor 400.

The energy storage 100 is an element that stores electric energy for driving the motor 400 in the form of direct current, such as a battery, and outputs DC power.

The capacitor 300 is connected in parallel between the inverter 200 that is connected to both ends of the energy storage 100 and will be described below in detail, and the energy storage 100, and stores the regenerative energy of the motor 400 during regenerative braking to form a DC link voltage Vdc. This DC link voltage Vdc becomes the input voltage of the inverter 200.

The inverter 200 includes a plurality of switching elements whose on/off state is controlled by a pulse-width modulation signal supplied from the controller 500, and converts DC power supplied from the energy storage 100 to AC power for driving the motor 400. Specifically, the inverter 200 may include a first leg 210 that includes a first switching element S1 and a second switching element S2 located on a lower end of the first switching element S1, a second leg 220 that includes a third switching element S3 and a fourth switching element S4 located on a lower end of the third switching element S3, and a third leg 230 that includes a fifth switching element S5 and a sixth switching element S6 located on a lower end of the fifth switching element S5. In this regard, it is to be understood that the switching of the inverter 200 means the switching of a three-phase voltage output from the inverter 200. Furthermore, output terminals of the first leg 210, the second leg 220, and the third leg 230 are connected to respective phases of the motor 400.

The motor 400 is driven by the AC power converted through the inverter 200. Various types of motors that are known to those skilled in the art may be employed. The motor of an eco-friendly vehicle may be a driving motor that provides a rotating force to a driving wheel of the vehicle.

The voltage sensor 600 serves to measure voltages (DC link voltage: Vdc) on both ends of the capacitor 300. Information about measured voltages on both ends of the capacitor 300 may be transmitted to the controller 500 and be used by the controller 500 to determine whether an overvoltage has occurred.

The rotation-angle sensor 700 is an element that detects the position of the rotor of the motor 400, i.e. the rotation angle of the rotor of the motor 400. The rotation-angle sensor 700 serves to detect the angle of the rotor of the motor 400, and to continuously output the rotation-angle detection signal including the information about the detected rotation angle of the rotor 400. According to an embodiment, the rotation-angle sensor 700 may be implemented with a resolver or the like.

The current sensor 900 serves to measure current that is output from the inverter 200 and input into the phase of the motor 400. According to an embodiment, when the motor 400 is a three-phase motor having phases a, b and c, two or more current sensors 900 may be provided to measure current input into at least two of the phases a, b and c.

The controller 500 may perform a control operation by a pulse-width modulation method in which the duty cycle (duty ratio) of the switching elements S1 to S6 of the inverter 200 is properly adjusted to control the torque of the motor 400 to a desired value (torque command).

In order to perform the control operation, when voltages on both ends of the capacitor 300 measured by the voltage sensor 600 are equal to or greater than a preset first voltage, the controller 500 controls the switching elements S1 to S6 in the inverter 200 so that the motor 400 outputs a value corresponding to a torque command value (torque target value that is desired to be obtained via the motor) for the motor 400 that is output from an external device.

Specifically, the controller 500 may include a memory 510, an overvoltage detector 520, a current control part 530, and a switching-element control part 540. The memory 510 stores a map of a current command (Id*, Iq*) to apply a zero vector to the motor 400 during the driving of the motor 400. The overvoltage detector 520 determines whether voltages on both ends of the capacitor 300 measured from the voltage sensor 600 are equal to or greater than the first voltage. The current control part 530 generates a voltage command (Vd*, Vq*) to cause a d-axis current (Id) and a q-axis current (Iq) fed back from the motor 400 to follow a d-axis current command (Id*) and a q-axis current command (Iq*) stored in the memory 510. The switching-element control part 540 operates the switching elements S1 to S6 in the inverter 200 in response to the generated voltage command (Vd*, Vq*).

Here, the current command (Id*, Iq*) stored in the memory 510 is a current command value that causes the zero vector to be applied to the motor 400 during the driving of the motor 400, thus generating minus torque in the motor 400, by turning on the first switching element S1, the third switching element S3, and the fifth switching element S5 or the second switching element S2, the fourth switching element S4, and the sixth switching element S6, when the plurality of switching elements is driven by the controller 500. The current command value may have a different value for each motor.

In other words, the current command (Id*, Iq*) stored in the memory 510 is a command value that is intended to apply the zero vector to the motor 400, thus generating the minus torque in the motor 400. When the current input into the motor 400 controls the switching elements S1 to S6 of the inverter 200 to follow the corresponding current command, the minus torque may be generated in the motor 400. Here, the current command may be a current command of a characteristic current value intended to apply the zero vector to the motor 400 during the driving of the motor 400. The current command value may have a different value for each motor.

In addition, the controller 500 may further include a coordinate conversion device that converts a two-phase coordinate into a three-phase coordinate or converts the three-phase coordinate into the two-phase coordinate. According to an embodiment, when the motor 400 is the three-phase motor having phases a, b, and c, the coordinate conversion device may convert the d-axis current (Id) and the q-axis current (Iq) into the three-phase currents (Ia, Ib, Ic) of a, b, and c, and may convert the three-phase currents (Ia, Ib, Ic) of a, b, and c into the d-axis current (Id) and the q-axis current (Iq). Since the conversion of the two-phase coordinate into the three-phase coordinate or the conversion of the three-phase coordinate into the two-phase coordinate is a well-known technique, a detailed description thereof will be omitted.

Hereinafter, the operating principle of the system for protecting the inverter in the vehicle from the overvoltage according to the present disclosure will be described with reference to FIGS. 3 to 7.

In a normal state where no failure occurs as shown in FIG. 3, the capacitor 300 may be charged with the regenerative energy of the motor 400 during the regenerative braking, so that the voltage of the capacitor 300 may rise. The voltage sensor 600 measures the voltages on both ends of the capacitor 300, and transmits the measured voltages on both ends of the capacitor 300 to the controller 500. The controller 500 determines whether the voltage of the capacitor is equal to or greater than a preset first voltage. In this regard, the first voltage may be a value extracted by an experimental value, and may be a voltage level at which the switching element included in the inverter may be burned out.

When it is determined that the voltage of the capacitor 300 measured by the voltage sensor 600 is equal to or greater than the preset first voltage, the controller 500 turns off the relay 800 that connects the energy storage 100 and the motor 400 as shown in FIG. 4.

Meanwhile, after the controller 500 turns off the relay 800 that connects the energy storage 100 and the motor 400 as shown in FIG. 4, the voltage of the capacitor 300 should be discharged to prevent the burn-out of the switching element in the inverter. The controller 500 according to the present disclosure may operate the switching element in the inverter in response to the current command (Id*, Iq*) pre-stored in the memory to apply the zero vector to the motor, thus allowing the voltage of the capacitor 300 to be discharged.

When the relay 800 is off as shown in FIG. 4, a closed loop circuit is formed between the capacitor 300, the inverter 200, and the motor 400. By driving the motor 400 through the control of the switching element in the inverter with the voltage charged in the capacitor 300 in such a closed loop circuit, the voltage of the capacitor 300 may be discharged.

Meanwhile, in a process where the relay 800 is off as shown in FIG. 4 and the voltage of the capacitor 300 is discharged, there may occur a problem in which the electric energy of the capacitor 300 rises rapidly due to the counter electromotive force of the motor 400 during coast driving and downhill driving, thus causing the inverter 400 to be burned out. In order to solve the problem, it is necessary to suppress the counter electromotive force of the motor 400 from being emitted during the coast driving and the downhill driving in the process of discharging the voltage of the capacitor 300. At this time, in order to suppress the counter electromotive force of the motor 400 from being emitted, it is necessary to reduce the speed of the motor 400. According to the present disclosure, the zero vector is applied to the motor 400 during the driving of the motor 400 to generate the minus torque in the motor 100, thus controlling the switching element S1 to S6 in the inverter 200 in response to the current command (Id*, Iq*) capable of preventing the counter electromotive force of the motor from being emitted. Consequently, it is possible to solve a problem in which the counter electromotive force of the motor 400 is emitted.

In other words, when voltages on both ends of the capacitor 300 measured by the voltage sensor 600 are equal to or greater than the first voltage, the controller 500 turns off the relay 800, and causes current supplied from the inverter 200 to the motor 400 to follow the current command that is pre-stored in the memory 510, thus discharging the voltage of the capacitor 300 and simultaneously suppressing the counter electromotive force of the motor 400 from being emitted.

Meanwhile, when voltages on both ends of the capacitor 300 measured by the voltage sensor 600 are equal to or greater than the first voltage, the controller 500 turns off the relay 800 as shown in FIG. 4, and causes the current supplied from the inverter 200 to the motor 400 to follow the current command that is pre-stored in the memory 510, thus discharging the voltage of the capacitor 300 up to a preset second voltage, and causes the voltage of the capacitor 300 to be maintained within an error range on the basis of the second voltage as shown in FIG. 6, after the voltage of the capacitor is discharged up to the second voltage.

Specifically, when voltages on both ends of the capacitor 300 are reduced below the error range on the basis of the second voltage, the controller 500 may increase the voltage of the capacitor 300 through regenerative braking. When voltages on both ends of the capacitor 300 exceed the error range on the basis of the second voltage, the controller 500 may maintain the voltage of the capacitor within the error range on the basis of the second voltage, by discharging the voltage of the capacitor through the driving of the motor.

Meanwhile, although not shown in the drawings in detail, a plurality of electronic components included in the vehicle is connected to the energy storage 100 via a circuit, and the corresponding electronic components are driven by power supplied from the energy storage 100. However, in a situation where the relay 800 is off as shown in FIG. 4, there was a problem in which the circuit connection between the electronic components and the energy storage 100 is cut off, so that power may not be supplied and thereby a safety accident may occur.

In order to solve the above-described problem, according to the present disclosure, in the situation where the relay 800 is off as shown in FIG. 4, the controller 500 discharges the voltage of the capacitor 300 up to the second voltage, but maintains the voltage of the capacitor 300 within the error range on the basis of the second voltage in the above-described method, so that energy stored in the capacitor 300 is supplied to the electronic components in the vehicle, thus increasing the driving time of the corresponding electronic components, and preventing the safety accident from occurring.

In addition, the controller 500 maintains the voltage of the capacitor 300 at a predetermined voltage level. Thus, since the pre-charge time of the capacitor 300 may be reduced when the vehicle is restarted during driving, the vehicle may have a quick response time when it is restarted.

The system for protecting the inverter in the vehicle from the overvoltage according to an embodiment of the present disclosure will be described with reference to FIG. 7. When the voltage of the capacitor 300 rises to be equal to or greater than the first voltage as in section A, the controller 500 turns off the relay 800 connecting the energy storage 100 and the motor 400, and operates the switching element S1 to S6 in the inverter 200 to drive the motor 400 in response to the current command intended to apply the zero vector to the motor 400 during the driving of the motor 400, thus discharging the voltage of the capacitor 300 as in section B.

In addition, the controller 500 discharges the voltage of the capacitor 300, but maintains the voltage of the capacitor within the error range on the basis of the second voltage as in section C, when the voltage reaches the second voltage.

Figure 8:
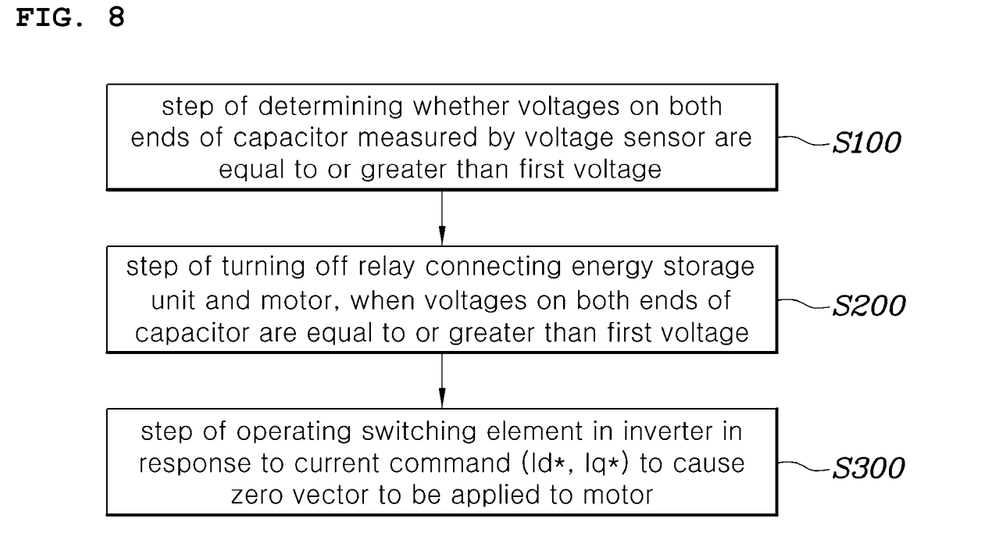
FIG. 8 is a flowchart illustrating a method for protecting an inverter in a vehicle from an overvoltage according to an embodiment of the present disclosure.

FIG. 8 is a flowchart illustrating a method for protecting an inverter in a vehicle from an overvoltage according to an embodiment of the present disclosure. As shown in FIG. 8, the method for protecting the inverter in the vehicle from the overvoltage according to the embodiment of the present disclosure may include a step of determining whether voltages on both ends of a capacitor measured by a voltage sensor are equal to or greater than a first voltage, a step of turning off a relay that connects an energy storage and a motor, when the voltages on both ends of the capacitor are equal to or greater than the first voltage, and a step of operating a switching element in the inverter in response to a current command (Id*, Iq*) to cause a zero vector to be applied to the motor.

The method may further include a step of storing, in a memory, a map of the current command (Id*, Iq*) to cause the zero vector to be applied to the motor, before the step of determining whether the voltages on both ends of the capacitor measured by the voltage sensor are equal to or greater than the first voltage.

In addition, the step of operating the switching element in the inverter in response to the current command (Id*, Iq*) to cause the zero vector to be applied to the motor may include a step of generating, in a current control part, a voltage command (Vd*, Vq*) to cause a d-axis current (Id) and a q-axis current (Iq) fed back from the motor to follow a d-axis current command (Id*) and a q-axis current command (Iq*) stored in the memory, and a step of operating, in a switching-element control part, the switching element in the inverter in response to the generated voltage command (Vd*, Vq*).

The method may further include, when the voltages on both ends of the capacitor are equal to or greater than the first voltage, after the step of turning off the relay that connects the energy storage and the motor, a step of discharging the voltage of the capacitor up to a preset second voltage, and a step of maintaining the voltage of the capacitor within an error range on the basis of the second voltage.

Specifically, in the step of maintaining the voltage of the capacitor within the error range on the basis of the second voltage, a controller may increase the voltage of the capacitor through regenerative braking when the voltages on both ends of the capacitor are reduced below the error range on the basis of the second voltage, and may discharge the voltage of the capacitor through driving of the motor when the voltages on both ends of the capacitor exceed the error range on the basis of the second voltage.

Meanwhile, since specific technical features at respective steps of the method for protecting the inverter in the vehicle from the overvoltage are the same as technical features of a detailed configuration of the above-described system for protecting the inverter in the vehicle from the overvoltage, a detailed description thereof will be omitted.

The aforementioned operations/functions performed by the controller can be embodied as computer readable code/algorithm/software stored on a computer readable recording medium. The computer readable recording medium is any data storage device that can store data which can thereafter be read by a computer or a processor/microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

The aforementioned controller may include one or more processors/microprocessors. The controller may perform the above described operations/functions, by executing the computer readable code/algorithm/software stored on the computer readable recording medium.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A system for protecting an inverter in a vehicle from an overvoltage, the system comprising:
    an inverter comprising a plurality of switching elements, and converting energy supplied from an energy storage unit into AC power;
    a motor driven by the AC power converted by the inverter;
    a capacitor connected in parallel between the inverter and the energy storage, and storing regenerative energy of the motor during regenerative braking; and
    a controller turning off a relay that connects the energy storage and the motor, when a voltage (DC-link voltage) of the capacitor measured by a voltage sensor is equal to or greater than a preset first voltage, and operating the switching elements in the inverter in response to a pre-stored current command (Id*, Iq*) to apply a zero vector to the motor,
    wherein, when the voltage on both ends of the capacitor is equal to or greater than the first voltage, the controller turns off the relay, and discharges the voltage of the capacitor up to a preset second voltage, and then causes the voltage of the capacitor to be maintained within an error range on the basis of the second voltage.

2. The system of claim 1, wherein the inverter comprises:
    a first leg comprising a first switching element and a second switching element located on a lower end of the first switching element;
    a second leg comprising a third switching element and a fourth switching element located on a lower end of the third switching element; and
    a third leg comprising a fifth switching element and a sixth switching element located on a lower end of the fifth switching element,
    wherein output terminals of the first leg, the second leg, and the third leg are connected to respective phases of the motor.

3. The system of claim 2, wherein, when the plurality of switching elements is driven, the current command (Id*, Iq*) causes the first switching element, the third switching element and the fifth switching element to be on, or causes the second switching element, the fourth switching element and the sixth switching element to be on, so as to apply the zero vector to the motor during driving of the motor and cause minus torque to be generated in the motor.

4. The system of claim 2, wherein the controller comprises:
    a memory storing a map of the current command (Id*, Iq*) causing the zero vector to be applied to the motor during the driving of the motor;
    an overvoltage detector determining whether a voltage on both ends of the capacitor measured by the voltage sensor is equal to or greater than the first voltage;
    a current control part generating a voltage command (Vd*, Vq*) to cause a d-axis current (Id) and a q-axis current (Iq) fed back from the motor to follow a d-axis current command (Id*) and a q-axis current command (Iq*) stored in the memory; and
    a switching-element control part operating the plurality of switching elements in the inverter in response to the generated voltage command (Vd*, Vq*).

5. The system of claim 1, wherein, when the measured voltage on both ends of the capacitor is equal to or greater than the first voltage, the controller turns off the relay, and causes current supplied from the inverter to the motor to follow the current command.

6. The system of claim 1, wherein, when the voltage on both ends of the capacitor is reduced below the error range on the basis of the second voltage, the controller increases the voltage of the capacitor through the regenerative braking, and when the voltage on both ends of the capacitor exceeds the error range on the basis of the second voltage, the controller discharges the voltage of the capacitor through the driving of the motor.

7. A method for protecting an inverter in a vehicle from an overvoltage, the method comprising:
    determining whether a voltage on both ends of a capacitor measured by a voltage sensor is equal to or greater than a first voltage;
    turning off a relay that connects an energy storage and a motor, when the voltage on both ends of the capacitor is equal to or greater than the first voltage;
    operating a switching element in the inverter in response to a current command (Id*, Iq*) to cause a zero vector to be applied to the motor; and
    when the voltage on both ends of the capacitor is equal to or greater than the first voltage, after turning off the relay that connects the energy storage and the motor, discharging the voltage of the capacitor up to a present second voltage, and maintaining the voltage of the capacitor within an error range on the basis of the second voltage.

8. The method of claim 7, further comprising:
before determining whether the voltage on both ends of the capacitor measured by the voltage sensor is equal to or greater than the first voltage,
storing, in a memory, a map of the current command (Id*, Iq*) to cause the zero vector to be applied to the motor.

9. The method of claim 8, wherein the operating of the switching element in the inverter in response to the current command (Id*, Iq*) to cause the zero vector to be applied to the motor comprises:
generating, by a current control part, a voltage command (Vd*, Vq*) to cause a d-axis current (Id) and a q-axis current (Iq) fed back from the motor to follow a d-axis current command (Id*) and a q-axis current command (Iq*) stored in the memory; and
operating, by a switching-element control part, the switching element in the inverter in response to the generated voltage command (Vd*, Vq*).

10. The method of claim 7, wherein the maintaining of the voltage of the capacitor within the error range on the basis of the second voltage comprises:
increasing, by a controller, the voltage of the capacitor through regenerative braking when the voltage on both ends of the capacitor is reduced below the error range on the basis of the second voltage; and
discharging, by the controller, the voltage of the capacitor through driving of the motor when the voltage on both ends of the capacitor exceeds the error range on the basis of the second voltage.

* * * * *